United States Patent
Oh et al.

(10) Patent No.: US 8,590,913 B1
(45) Date of Patent: Nov. 26, 2013

(54) INTELLIGENT SIDE STEP APPARATUS FOR VEHICLE

(71) Applicants: Hyundai Motor Company, Seoul (KR); Kia Motors Corp., Seoul (KR)

(72) Inventors: Young Sub Oh, Suwon-si (KR); Hyun Gyung Kim, Suwon-si (KR); Dong Eun Cha, Suwon-si (KR); Bock Cheol Lee, Suwon-si (KR); Seung Mok Lee, Osan-si (KR); Phil Jung Jeong, Yongin-si (KR)

(73) Assignees: Hyundai Motor Company, Seoul (KR); Kia Motors Corp., Seoul (KR)

( * ) Notice: Subject to any disclaimer, the term of this patent is extended or adjusted under 35 U.S.C. 154(b) by 0 days.

(21) Appl. No.: 13/800,216

(22) Filed: Mar. 13, 2013

(30) Foreign Application Priority Data

Nov. 7, 2012 (KR) .......................... 10-2012-0125127

(51) Int. Cl.
    *B60R 3/00* (2006.01)
(52) U.S. Cl.
    USPC .......................................... 280/166; 280/163
(58) Field of Classification Search
    USPC .................. 280/163, 166, 164.1, 769; 182/88
    See application file for complete search history.

(56) References Cited

U.S. PATENT DOCUMENTS

| | | | | |
|---|---|---|---|---|
| 5,842,709 A * | 12/1998 | Maccabee | ...................... | 280/166 |
| 5,957,237 A * | 9/1999 | Tigner | ........................ | 182/127 |
| 7,377,531 B2 * | 5/2008 | Fabiano et al. | ............... | 280/163 |
| 7,513,520 B2 * | 4/2009 | Okuyama | .................... | 280/166 |
| 7,857,337 B2 * | 12/2010 | Ferguson et al. | ............ | 280/166 |

FOREIGN PATENT DOCUMENTS

KR 10-2005-0031491 A 4/2005

* cited by examiner

*Primary Examiner* — John Walters
*Assistant Examiner* — James Triggs
(74) *Attorney, Agent, or Firm* — Morgan, Lewis & Bockius LLP

(57) ABSTRACT

An intelligent side step apparatus for a vehicle may include a base block that is fixed to a vehicle body panel disposed at a lower end of a vehicle door, a step motor that is fixed to the base block, a driving shaft that is engaged with the step motor and is rotated by power transmitted from the step motor, a plurality of joint steps that are pivotally coupled each other in sequence, and a step operating mechanism that is coupled with the driving shaft and engaged with each of the joint steps, rotates with the driving shaft, and moves in a forward or backward direction according to rotation of the driving shaft, and wherein one of the plurality of joint steps is pivotally connected to the base block.

7 Claims, 5 Drawing Sheets

INTELLIGENT SIDE STEP APPARATUS FOR VEHICLE

CROSS-REFERENCE TO RELATED APPLICATION

The present application claims priority to Korean Patent Application No. 10-2012-0125127 filed on Nov. 7, 2012, the entire contents of which is incorporated herein for all purposes by this reference.

BACKGROUND OF THE INVENTION

1. Field of the Invention

The present invention relates to an intelligent side step apparatus for a vehicle, and more particularly, an intelligent side step apparatus for a vehicle which operates in a rotary type and extends in the left-right direction (width direction) of a vehicle.

2. Description of Related Art

Some of recreation vehicles higher than sedans are equipped with a sidestep 1 for convenient of a passenger, as shown in FIG. 1.

However, a common sidestep 1 is simply fixed to a vehicle body 2 (side sill outer panel) and cannot expand in the left-right direction (width direction), so that a passenger is inconvenienced in using the sidestep 1 when getting in/out of a vehicle.

That is, a passenger can step on the sidestep 1 well in getting out of a vehicle and accordingly it is possible to prevent the passenger from getting hurt from a fall only when the sidestep 1 is conspicuous to the passenger, and the passenger can easily step and get in the vehicle only when the sidestep 1 protrudes much from the vehicle body 2.

However, since the sidestep 1 of the related art has a structure fixed to the vehicle body 2 not to expand in the left-right direction (width direction) of the vehicle body, a passenger is inconvenienced in using the sidestep 1 for getting in/out of a vehicle.

The description provided above as a related art of the present invention is just for helping understanding the background of the present invention and should not be construed as being included in the related art known by those skilled in the art.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to contributing to improving convenience of a passenger getting in/out a vehicle and improving the commercial value of the vehicle, by providing a side step apparatus for a vehicle which can operate in a rotary type and expand in the left-right direction (width direction) of the vehicle body.

In an aspect of the present invention, an intelligent side step apparatus for a vehicle, may include a base block that is fixed to a vehicle body panel disposed at a lower end of a vehicle door, a step motor that is fixed to the base block, a driving shaft that is engaged with the step motor and is rotated by power transmitted from the step motor, a plurality of joint steps that are pivotally coupled each other in sequence, and a step operating mechanism that is coupled with the driving shaft and engaged with each of the joint steps, rotates with the driving shaft, and moves in a forward or backward direction according to rotation of the driving shaft, and wherein one of the plurality of joint steps is pivotally connected to the base block, and wherein the joint steps are retracted to come in close contact with the vehicle body panel or deployed and drawn out in a vehicle width direction according to a movement of the step operating mechanism.

The step operating mechanism may include a plurality of bolt shafts pivotally connected each other in sequence along a longitudinal direction of the driving shaft, wherein one of the bolt shafts is pivotally connected to the driving shaft, and movable nuts that are slidably engaged onto the bolt shafts and pivotally engaged to the joint steps, respectively, wherein each movable nut moves straight along corresponding bolt shaft, when the corresponding bolt shaft rotates.

The apparatus may further include nut protrusions that integrally protrude from the movable nuts and are pivotally coupled to corresponding joint steps.

The apparatus may further include universal joints that pivotally connect the bolt shafts, wherein one of the universal joints pivotally connects the driving shaft with one of the bolt shafts.

The joint steps may have upper step portions that are arranged in sequence and pivotally connected with each other by corresponding hinge shaft to be rotatable with respect to the base block, intermediate vertical portions that protrude downward from the upper step portions, wherein the nut protrusions are pivotally coupled thereto, and lower cover portions that bend toward the base block in parallel with the upper step portions at each ends of the intermediate vertical portions.

A position of each joint step where a corresponding hinge shaft is coupled is disposed closer to the base block than a position of the each joint step where a corresponding nut protrusion is coupled.

The vehicle body panel that the base block is fixed is a side sill outer panel at the lower end of the vehicle door.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIGS. 6 and 5 are views illustrating the operational status of a side step apparatus for a vehicle according to an exemplary embodiment of the present invention.

Figure 1:
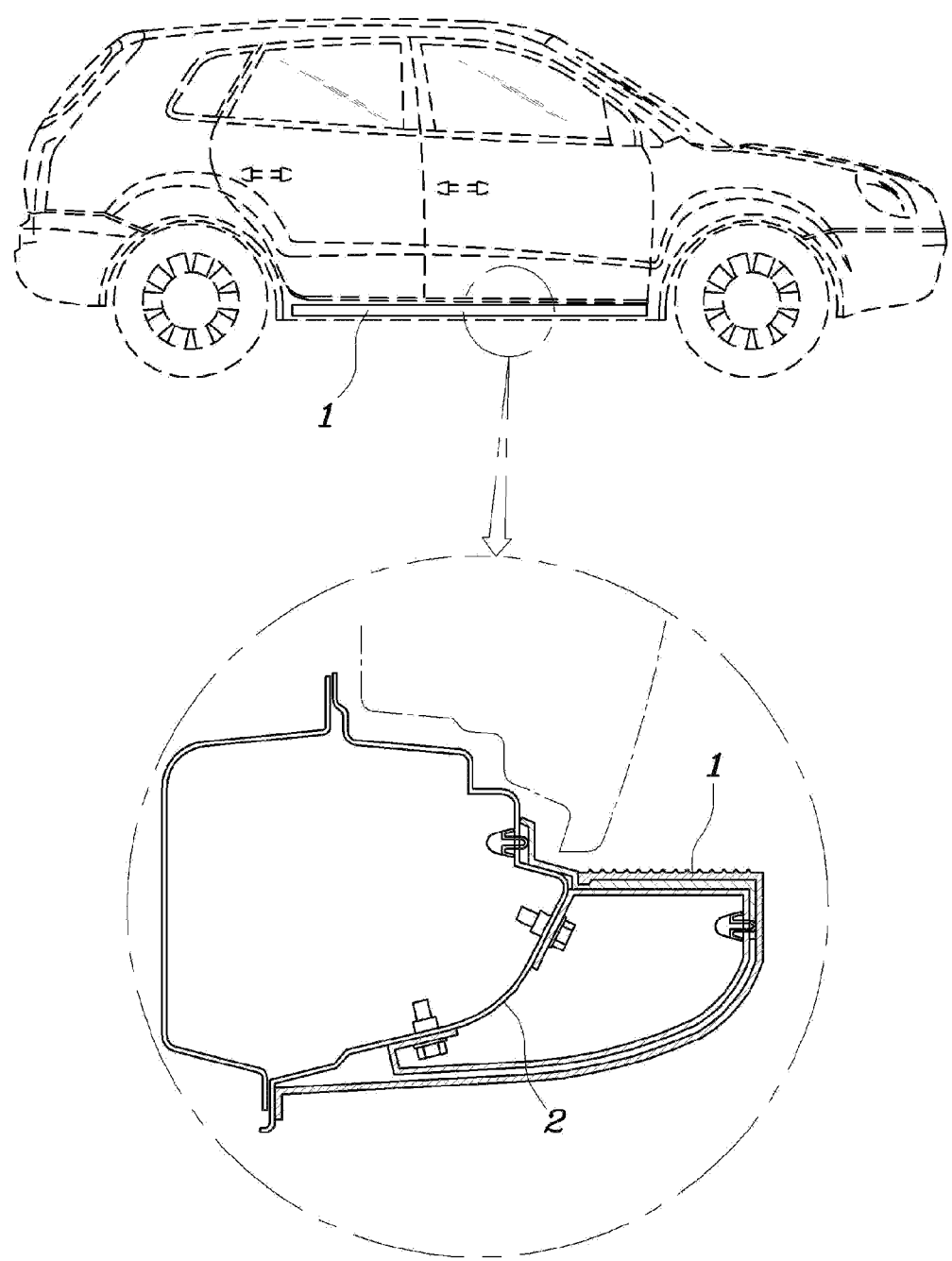
FIG. 1 is a view illustrating a side step of the related art.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

A side step apparatus for a vehicle according to embodiments of the present invention is described hereafter in detail with reference to the accompanying drawings.

A side step apparatus for a vehicle according to an exemplary embodiment of the present invention, as shown in FIGS. 2 to 6, includes: a base block 10 that is fixed to a vehicle body panel 4 at the lower end of a vehicle door 3, a step motor 20 that is fixed to the base block 10, a driving shaft 30 that is rotated by power transmitted from the step motor 20, a step operating mechanism 40 that is connected with the driving shaft 30, rotates with the driving shaft 30, and moves straight left and right while rotating, and a plurality of joint steps 50 that is rotatably connected to the base block 10, connected with the step operating mechanism 40, and retracted to come in close contact with the vehicle body panel 4 or deployed and drawn out in the vehicle width direction, when the step operating mechanism 40 moves straight.

It is preferable that the vehicle body panel 4 where the base block 10 is fixed is a side sill outer panel at the lower end of the vehicle door 3.

That is, the joint steps 50 of the side step, disposed to provide convenience for a passenger getting in/out of a vehicle, are preferable disposed at the door of the vehicle for a passenger to conveniently use the joint steps 50, and for this purpose, the vehicle body panel 4 where the base block 10 is fixed is the side sill outer panel positioned at the lower end of the vehicle door 3.

Further, the driving shaft 30 is disposed under the step motor 20 in parallel with the motor shaft 21 through a guide hole 15 of the base block 10 to be rotatable with respect to the base block 10, a sprocket 61 is coupled to the ends of the motor shaft 21 and the driving shaft 30, and the sprockets 61 are connected to be able to transmit power through a power transmission member 62 such as a belt or a chain.

Therefore, as the step motor 20 operates, the torque of the motor shaft 21 is transmitted to the driving shaft 30 through the sprocket 61 and the chain 62, so that the driving shaft 30 is rotated.

The step operating mechanism 40 includes: a plurality of bolt shafts 41 that is disposed in the longitudinal direction of the driving shaft 30, a universal joint 42 that connects the driving shaft 30 with the bolt shaft 41 and connects the bolt shafts 41, wherein a portion of the bolt shafts 41 is formed with a screw on outside surface thereof and engaged to an inner surface of movable nuts 43, wherein the inner surface of the movable nuts 43 is formed with a screw such that the movable nuts 43 move straight along the bolt shaft 41, when the bolt shafts 41 rotate, and nut protrusions 44 that integrally protrude from the movable nuts 43 and are coupled to the joint steps 50.

Further, the joint steps 50 have: upper step portions 51 that are arranged in a straight line and rotatably connected with each other by hinge shafts 63 to be rotatable with respect to the base block 10, intermediate vertical portions that protrude downward from the upper step portions 51 and are coupled to the nut protrusions 44, and lower cover portions 53 that bend toward the base block 10 in parallel with the upper step portions 51 at the ends of the intermediate vertical portions 52.

The step operating mechanism 40 is positioned inside the joint steps 50 and the movable nuts of the step operating mechanism 40 are positioned at the intermediate vertical portions 52 and engaged to the lower ends of the intermediate vertical portions 52 by the nut protrusions 44.

Meanwhile, in an exemplary embodiment of the present invention, the position of the joint step 50 where the hinge shaft 60 is coupled is closer to the base block 10 than the position where the nut protrusion 44 is coupled.

That is, the hinge shaft 63 is the rotational center of the joint step 50 and the nut protrusion 44 is the point of action where force is exerted in the joint step 50, so the further the nut protrusion 44 that is the point of action of force from the hinge shaft 63 and the closer the hinge shaft 63 to the base block 10 than the nut protrusion 44, the more the joint step 50 can be easily rotated.

Figure 2:
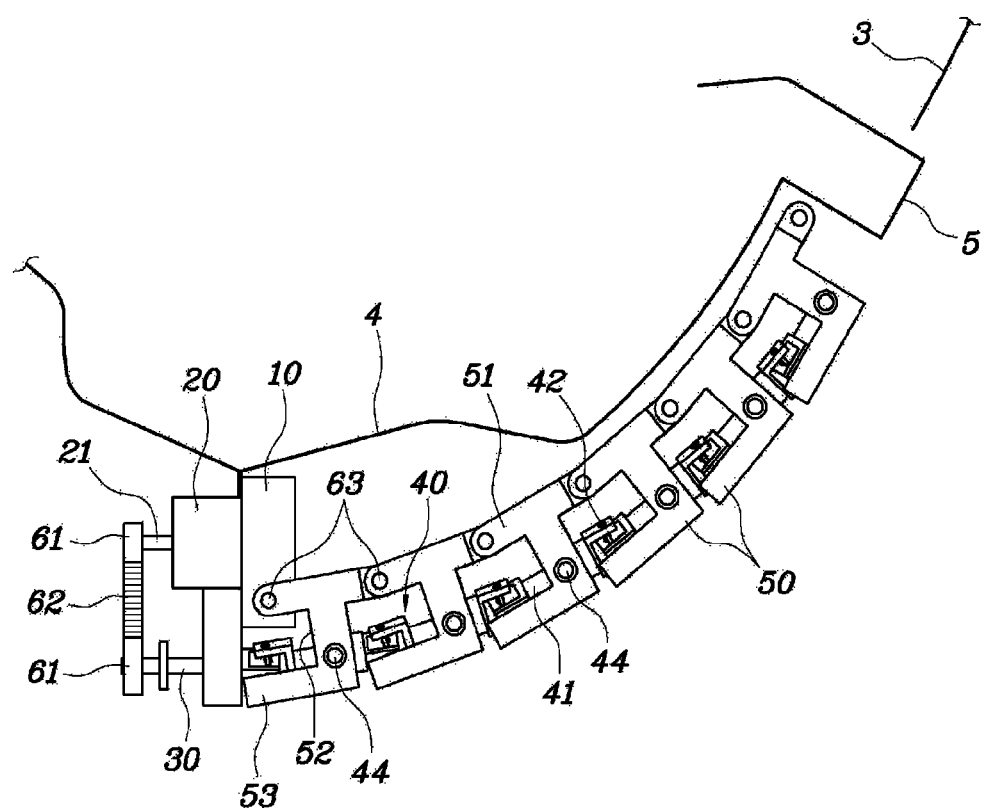
FIG. 2 is a view illustrating a side step apparatus for a vehicle according to an exemplary embodiment of the present invention.
Figure 3:
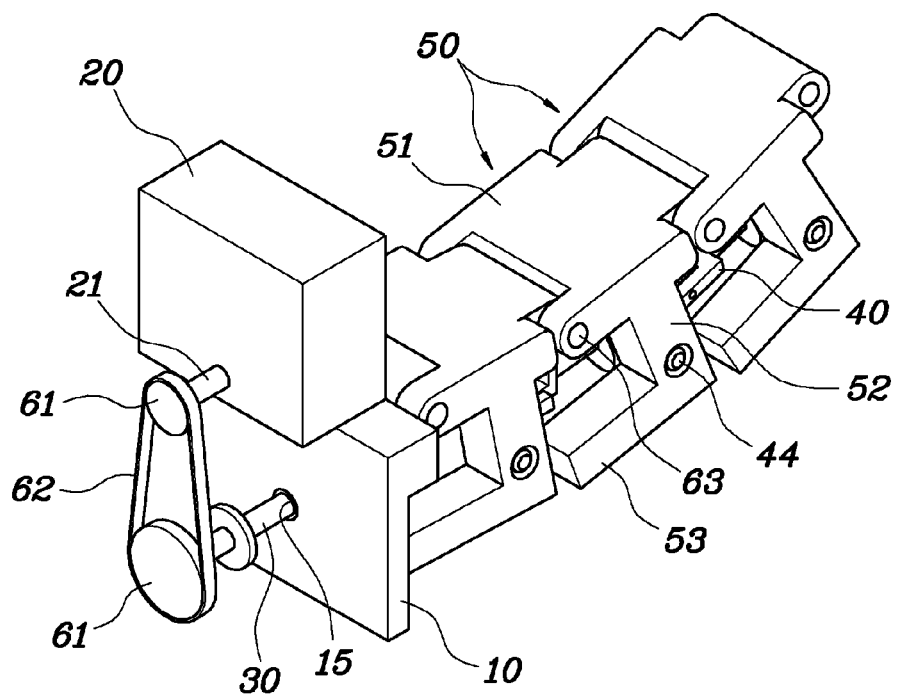
FIGS. 3 and 4 are a perspective view and a bottom view of a side step apparatus of the present invention.

Reference number 5 shown in FIG. 2 and not described indicates a side sill molding.

The operation of an exemplary embodiment of the present invention is provided hereafter.

In FIG. 2, the steps 50 are in close contact with the vehicle body panel 4 (side sill outer panel) by rotating upward about the hinge shafts 63, in which the joint steps 50 are in a retraction position where a passenger cannot use them.

As a passenger operates a switch to use the joint steps 50, the torque of the step motor 20 is transmitted to the driving shaft 30 through the motor shaft 21, the sprocket 61, and the power transmission member 62 and the driving shaft 30 rotates with respect the base block 10.

Figure 4:
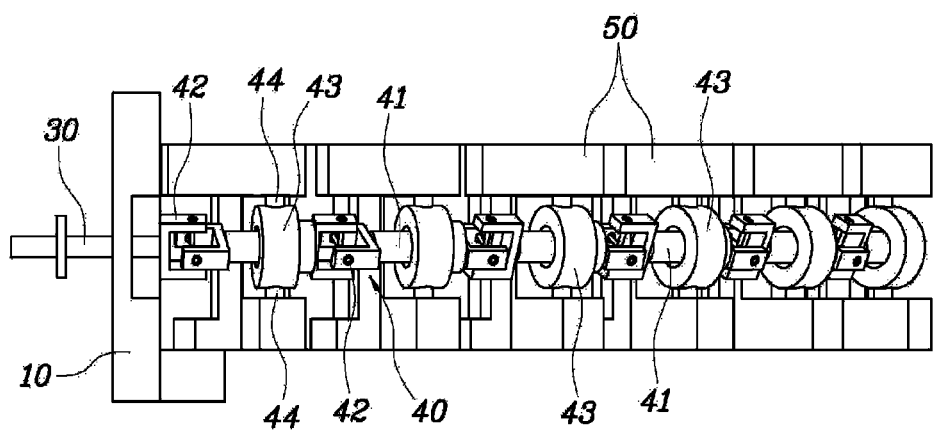
Figure 5:
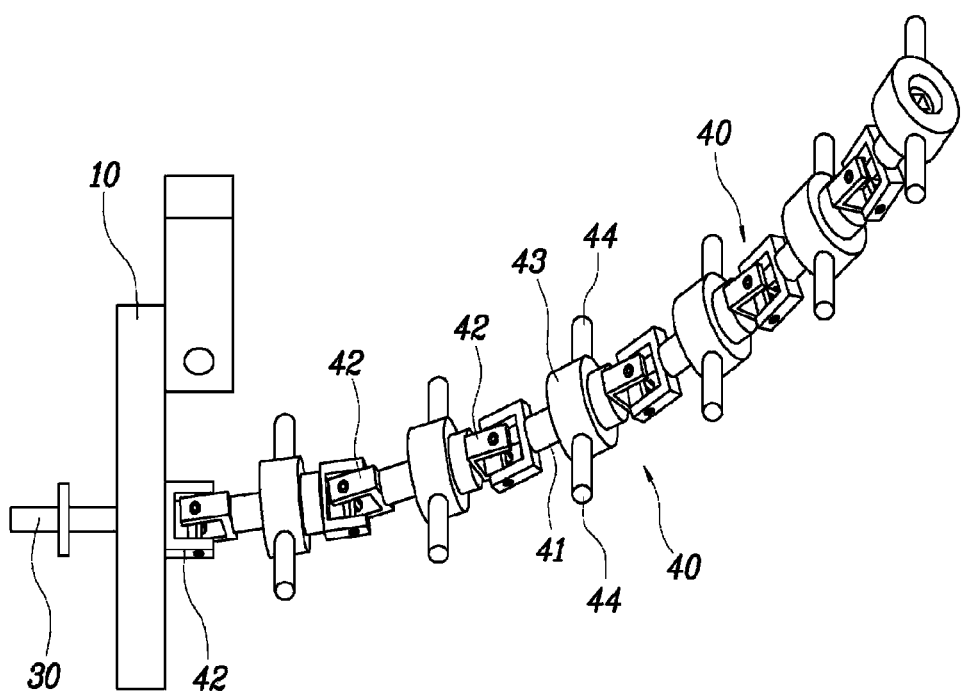
FIG. 5 is a view illustrating a step operating mechanism according to an exemplary embodiment of the present invention.

As the driving shaft 30 rotates, the bolt shafts 41 are correspondingly rotated by the universal joints 42, and as the bolt shafts 41 rotate, the movable nuts 43 move straight left to the base block from the status shown in FIG. 4.

Figure 6:
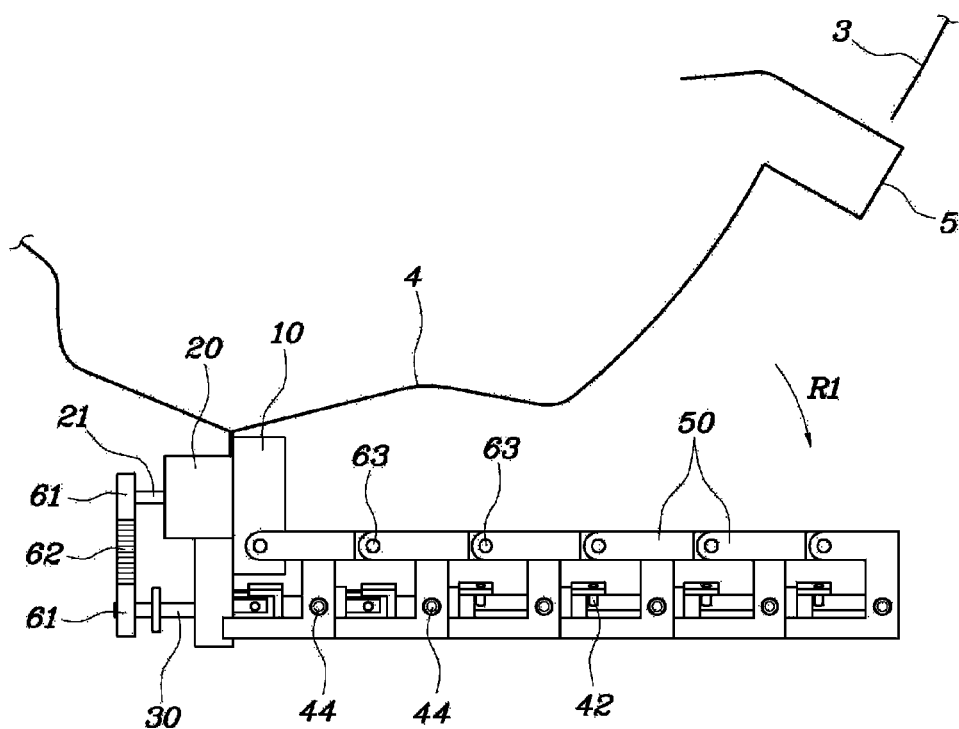

As described above, as the movable nut 43 move left to the base block 10, the nut protrusions 44 pull down the joint steps 50 from the status shown in FIG. 2 and the joint steps 50 are rotated clockwise (in the direction of an arrow R1 in FIG. 6) about the hinge shafts 63 from the status shown in FIG. 2, drawn out in the width direction of the vehicle (to a side of the vehicle body) and deployed (expanded), as shown in FIG. 6, by the force of the nut protrusions 44 pulling the joint steps 50.

Accordingly, a passenger to get in/out of a vehicle can get in/out of the vehicle, seeing the joint step 50 expanding to the side of the vehicle body, with a foot correctly on it, so that it is possible to prevent the passenger from undesirably getting hurt from a fall and considerably improve safety and convenience of the passenger.

Further, as shown in FIG. 6, the joint steps 50 rotate counterclockwise about the hinge shafts 63, when the step motor 20 operates rearward, so that they returns to the retraction status, as shown in FIG. 2.

According to the side step apparatus for a vehicle of the present invention, as a passenger can get in/out of a vehicle, seeing the joint step expanding to the side of a vehicle body, with a foot correctly on it, it is possible to considerably improve convenience of the passenger getting in/out of a vehicle and to prevent the passenger from getting hurt from a fall, so that it is possible to more safely protect the passenger.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An intelligent side step apparatus for a vehicle, comprising:
    a base block that is fixed to a vehicle body panel disposed at a lower end of a vehicle door;
    a step motor that is fixed to the base block;
    a driving shaft that is engaged with the step motor and is rotated by power transmitted from the step motor;
    a plurality of joint steps that are pivotally coupled each other in sequence; and
    a step operating mechanism that is coupled with the driving shaft, positioned inside of the joint steps and engaged with each of the joint steps, rotates with the driving shaft, and moves in a forward or backward direction according to rotation of the driving shaft, and
    wherein one of the plurality of joint steps is pivotally connected to the base block, and
    wherein the joint steps are retracted to come in close contact with the vehicle body panel or deployed and drawn out in a vehicle width direction according to a movement of the step operating mechanism.

2. The apparatus of claim 1, wherein the step operating mechanism includes:
    a plurality of bolt shafts pivotally connected each other in sequence along a longitudinal direction of the driving shaft, wherein one of the bolt shafts is pivotally connected to the driving shaft; and
    movable nuts that are slidably engaged onto the bolt shafts and pivotally engaged to the joint steps, respectively, wherein each movable nut moves straight along corresponding bolt shaft, when the corresponding bolt shaft rotates.

3. The apparatus of claim 2, further including nut protrusions that integrally protrude from the movable nuts and are pivotally coupled to corresponding joint steps.

4. The apparatus of claim 2, further including universal joints that pivotally connect the bolt shafts, wherein one of the universal joints pivotally connects the driving shaft with one of the bolt shafts.

5. The apparatus of claim 2, wherein the joint steps have:
    upper step portions that are arranged in sequence and pivotally connected with each other by corresponding hinge shaft to be rotatable with respect to the base block;
    intermediate vertical portions that protrude downward from the upper step portions, wherein the nut protrusions are pivotally coupled thereto; and
    lower cover portions that bend toward the base block in parallel with the upper step portions at each ends of the intermediate vertical portions.

6. The apparatus of claim 5, wherein a position of each joint step where a corresponding hinge shaft is coupled is disposed closer to the base block than a position of the each joint step where a corresponding nut protrusion is coupled.

7. The apparatus of claim 1, wherein the vehicle body panel that the base block is fixed is a side sill outer panel at the lower end of the vehicle door.

* * * * *